United States Patent [19]

Rybicki

[11] 4,093,400
[45] June 6, 1978

[54] CROSS BEAM ROTOR

[75] Inventor: Robert Charles Rybicki, Trumbull, Conn.

[73] Assignee: United Technologies Corporation, Hartford, Conn.

[21] Appl. No.: 751,006

[22] Filed: Dec. 15, 1976

[51] Int. Cl.² .............................................. B64C 27/38
[52] U.S. Cl. .................... 416/141; 416/134 A
[58] Field of Search ............... 416/134 A, 138 A, 141, 416/226

[56] References Cited

U.S. PATENT DOCUMENTS

| | | | |
|---|---|---|---|
| 2,830,669 | 4/1958 | Klockner | 416/141 X |
| 2,949,967 | 8/1960 | Jovanovich | 416/134 A |
| 3,193,019 | 7/1965 | Drees et al. | 416/141 X |
| 3,874,815 | 4/1975 | Baskin | 416/134 A |
| 3,880,551 | 4/1975 | Kisovec | 416/138 A X |
| 3,999,887 | 12/1976 | McGuire | 416/134 A |
| 4,008,980 | 2/1977 | Noehren et al. | 416/134 A |

*Primary Examiner*—Everette A. Powell, Jr.
*Attorney, Agent, or Firm*—Vernon F. Hauschild

[57] ABSTRACT

A helicopter rotor having flexible blades mounted to a drive shaft by means of hub arms, wherein opposing blade members are interconnected by a common spar passing across the rotor axis. The spar members are supported from the hub arms by spherical bearing members. The universal freedom of these bearing members provides torsional freedom for blade pitching motions without restricting blade flapping or in-plane bending.

9 Claims, 14 Drawing Figures

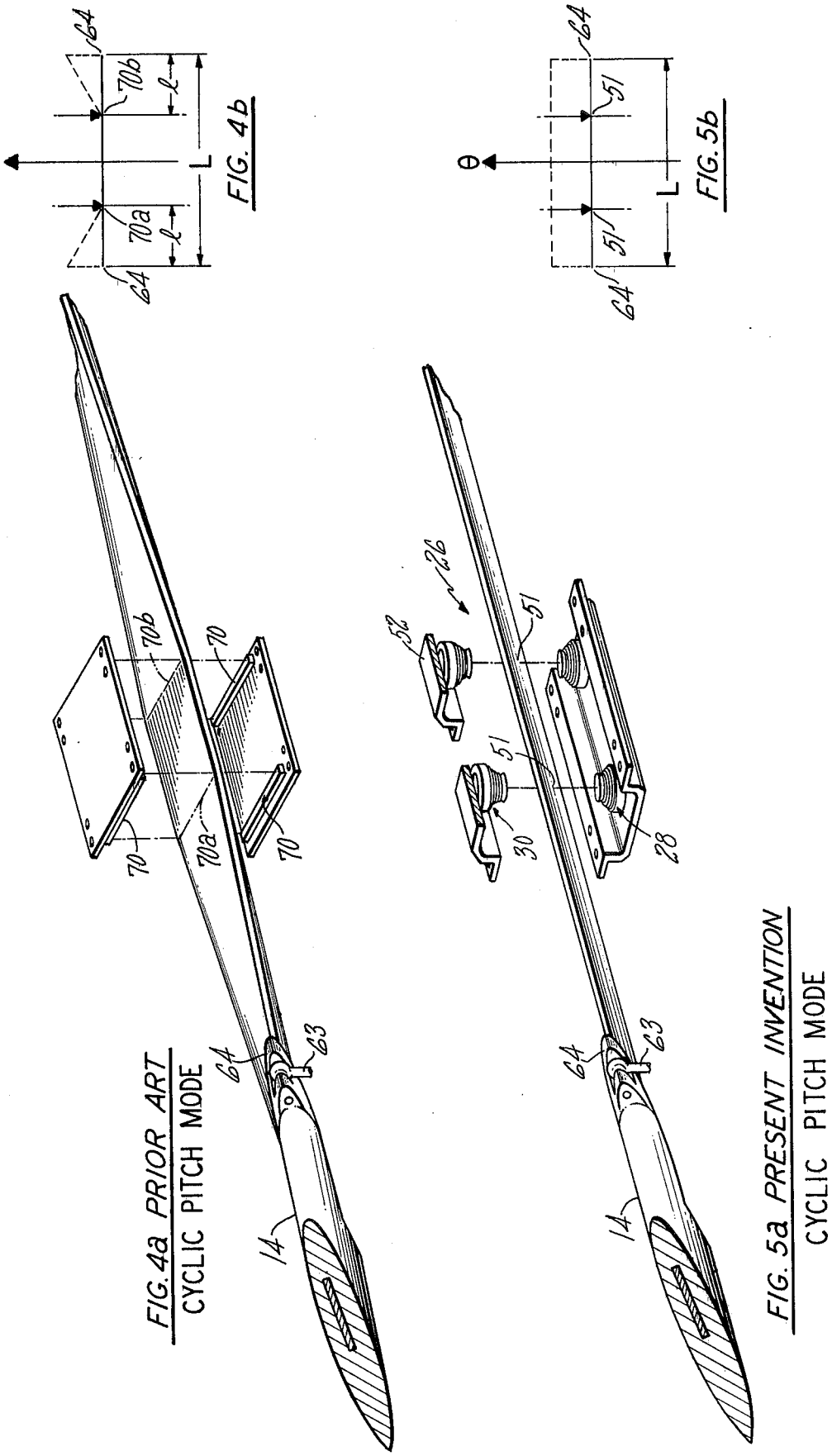

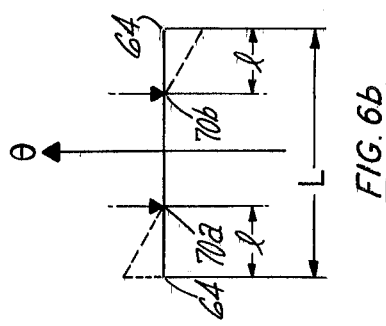
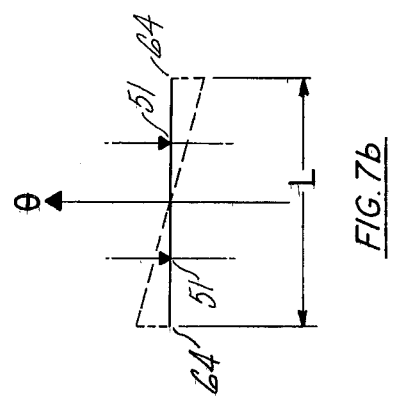
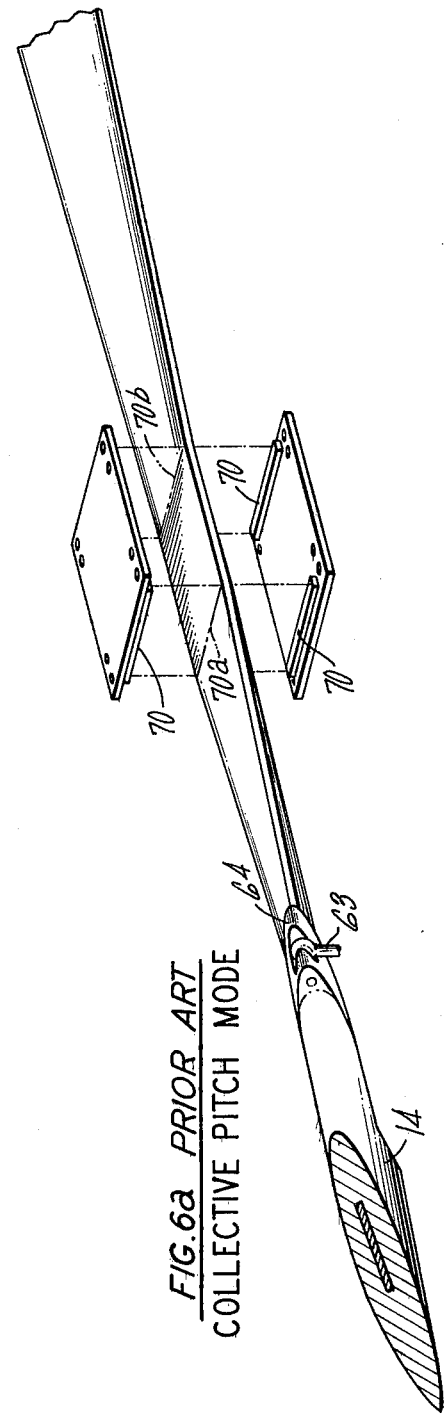
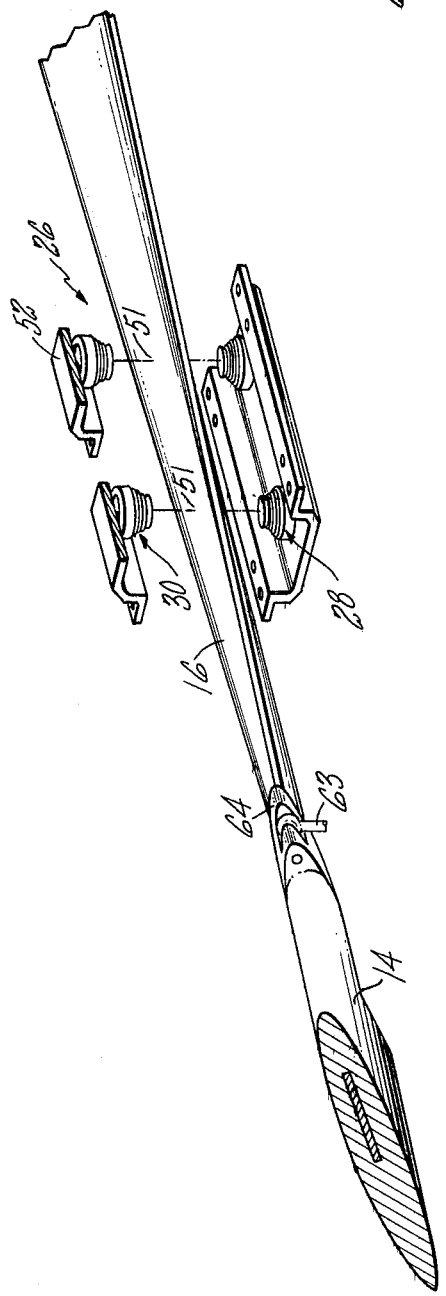

CROSS BEAM ROTOR

BACKGROUND OF THE INVENTION

1. Field of the Invention

This invention relates to helicopter rotors having an even number of blades wherein the opposed blades have a common rotor hub attachment member in the form of a flexible spar. Such a rotor is identified herein as a cross-beam rotor. The spar is preferably fabricated of uni-directional, high tensile strength fibers bonded together to be rectangular in cross-section. The spar reacts the centrifugal load between opposite blades and may extend the full span of both blades to each tip, or may terminate with an attachment connection at a convenient radial station. The full tip-to-tip spar embodiment is generally limited to helicopter tail rotor applications, since a main rotor spar of such embodiment of 90 feet or more in length would be too cumbersome to handle in the field as a single unit. The rectangular spar section is designed to provide the desired blade stiffness in the in-plane, lead-lag direction, and also to provide a greater degree of flexibility to allow blade motions due to pitch change and flapping. Pitch motions will introduce twisting into the spar member, and flapping will introduce transverse bending. This invention is directed to the providing of a flexible supporting means for the rotor blades which will not only provide a suitable driving connection between the hub and the blade, but will permit twisting and bending of the blade spar over a greater portion of its full length, so that these deformations may be accommodated inboard of the support attachment points and pass across the rotor axis.

2. Description of the Prior Art

In its earliest form, the development efforts of the assignee of this application towards elimination of conventional rotor stack bearings in favor of a flexible cross-beam rotor took the form of the embodiment depicted in its Canadian Patent to Arcidiacono No. 951,301 filed Nov. 10, 1971 and issued July 16, 1974. In Arcidiacono, the flexible straps were sandwiched between two hub plates, and pitch inputs were introduced by means of a shell which attached to the flexible strap at a point approximately 30 percent of the rotor radius. Blade pitch motions resulted in torsional strap deflections which terminate at the hub members. The slotted hub plates into which the blade spar members are recessed provides means to impart drive between the drive shaft connected hub plates and the blades. The U.S. Pat. No. 3,484,174 to McCoubrey illustrates a second embodiment of a cross-beam rotor with a gimbaled flapping hinge. The connection of the flexible member to the hinge member provides for similar torsion deflection means as in Arcidiacono in that the spar portions are rigidly clamped. Drive means is imparted from the drive shaft through a splined connection in the yoke assembly to an irregularly shaped insert and collar adapted to bear against the center portion of the spar in its spread apart relationship as it passes around the rotor axis.

The assignee's U.S. Pat. No. 3,874,820 to Fenaughty illustrates a further development in the field of this invention and is addressed principally to the angular relationship between the airfoil and supporting spar member. While the blade supporting structure is not shown, the structure utilized for flight aircraft comprised upper and lower clamp members which functioned similar to the structure shown in the Arcidiacono Patent. A still further development is presented in assignee's U.S. Pat. No. 4,008,980 Hibyan and Noehren issued Feb. 22, 1977, which shows the support structure referred to in the above reference to the Fenaughty patent. This structure was also incorporated into the assignee's YUH-60A prototype helicopters and is further described in the paper entitled: "Composite Bearingless Tail Rotor For UTTAS" dated May 1976 by R. Fenaughty and W. Noehren presented at the 32nd Annual National V/STOL Forum of the American Helicopter Society. The U.S. Pat. No. 3,874,815 to Baskin advanced the field of art by introducing flexible transverse pads in place of either the rigid clamps of Arcidiacono and others, or the metal gimbal bearings of McCoubrey. By means of the pad or flexure member located transverse to the spar member, flexibility is provided to allow bending deflections caused by blade flapping to take place inboard of the radial position of the flexure member; a feature not provided for by the fully clamped hub of Arcidiacono or McCoubrey. Similar to Arcidiacono, the spar members of Baskin are captured on their edges between bolted hub plates, the lower of which is connected to the drive shaft.

SUMMARY OF THE INVENTION

The present invention addresses the problem of the existence of high oscillatory torsional stresses imposed on the flexible spar members at their respective mounting means. These stresses are due to the cyclic pitch change requirements inposed upon the blades as they rotate around the azimuth. Since the blades are utilized in opposed pairs, this cyclic action will present an angle of attack change in a positive direction on one side of the rotor disc while simultaneously imposing a negative change to the angle of attack of the opposite blade. Since the prior art blade spar members are attached to the hub in a torsionally rigid and freedom restricting manner, such cyclic torsion motion will create high periodic stresses at the hub attachment station. In accordance with the teaching of this invention, a torsionally flexible hub/blade support member is utilized, the result being that no such oscillatory torsional stresses are introduced. The addition of this second degree of freedom to the blade support must not constrain the freedom provided for as illustrated in the Baskin patent, that is, to allow blade flapping to produce transverse bending of the blade both inboard and outboard of its supporting members. Lead-lag motion (in-plane bending) must also be accommodated. Further, this added freedom must be integrated with the rotor drive means without compromise to either function. A further benefit of the invention of this application is the minimizing or lowering of the steady state torsional stresses on the spar members created by the imposition of collective pitch inputs which demand that simultaneous changes in angle of attack be introduced into all blades regardless of azimuthal position. While the means of accomplishing this reduced stress is made possible by the torsional freedom of the blade mounting, the stress reduction is a function of the span over which spar twist occurs. The blade support of this invention increases that distance to its fullest and therefore reduces stress for a constant angle of attack.

It is an important object of this invention to teach a cross-beam rotor construction in which the flexible spar is universally supported from the hub between spaced spherical bearings so that the spar, and hence the blade supported therefrom, has freedom of motion in flapping, lead-lag, pitch change motion, and all combinations thereof.

It is a further object of this invention to teach such a cross-beam rotor construction in which all spar twisting required for pitch change is accommodated over the full spar length between the pitch horns, and in which no spar twisting occurs outboard thereof.

It is still a further object of this invention to teach a cross-beam rotor which is aerodynamically efficient in that the true airfoil shape of the blade can extend radially inward to its fullest. Our construction does not require the inboard end of the blade to be made larger in cross-sectional envelope to provide clearance for relative pitch change motion between the spar and the blade. The prior art hardware (e.g. torque tube) required to produce and maintain this clearance envelope is also not required.

BRIEF DESCRIPTION OF THE DRAWINGS

FIGS. 4a and 4b are isometric and graphical illustrations respectively of a two-bladed prior art rotor head spar in the cyclic pitch mode.

FIGS. 5a and 5b are isometric and graphical illustrations respectively of a two-bladed rotor spar incorporating the bearing assembly of this invention and in the cyclic pitch mode.

FIGS. 6a and 6b are isometric and graphical illustrations respectively of a two-blade prior art rotor head spar in the collective pitch input mode.

FIGS. 7a and 7b are isometric and graphical illustrations of a two-bladed rotor spar incorporating the bearing assembly of this invention and in the collective pitch input mode.

DESCRIPTION OF THE PREFERRED EMBODIMENT

Figure 1:
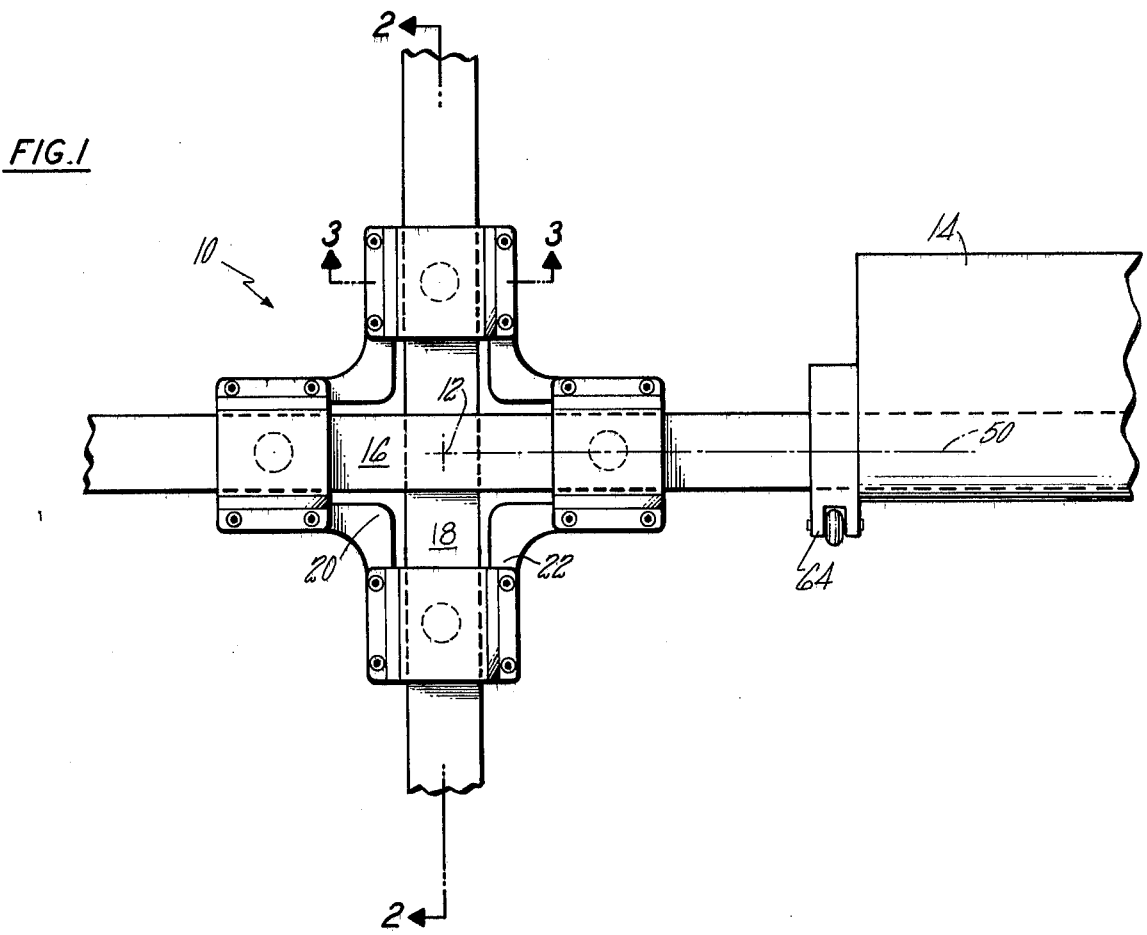
FIG. 1 is a plan view of a four-bladed helicopter rotor of the cross-beam configuration, illustrating the spar/hub connections.
Figure 3:
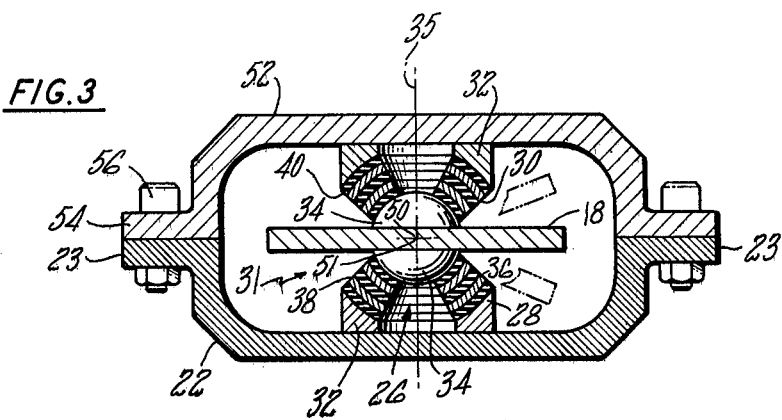
FIG. 3 is a cross-sectional view taken along the lines 3—3 of FIG. 1 to show the span-wise orientation of the blade support and to indicate the range of blade pitch motion relative to the rotor drive means.
Figure 2:
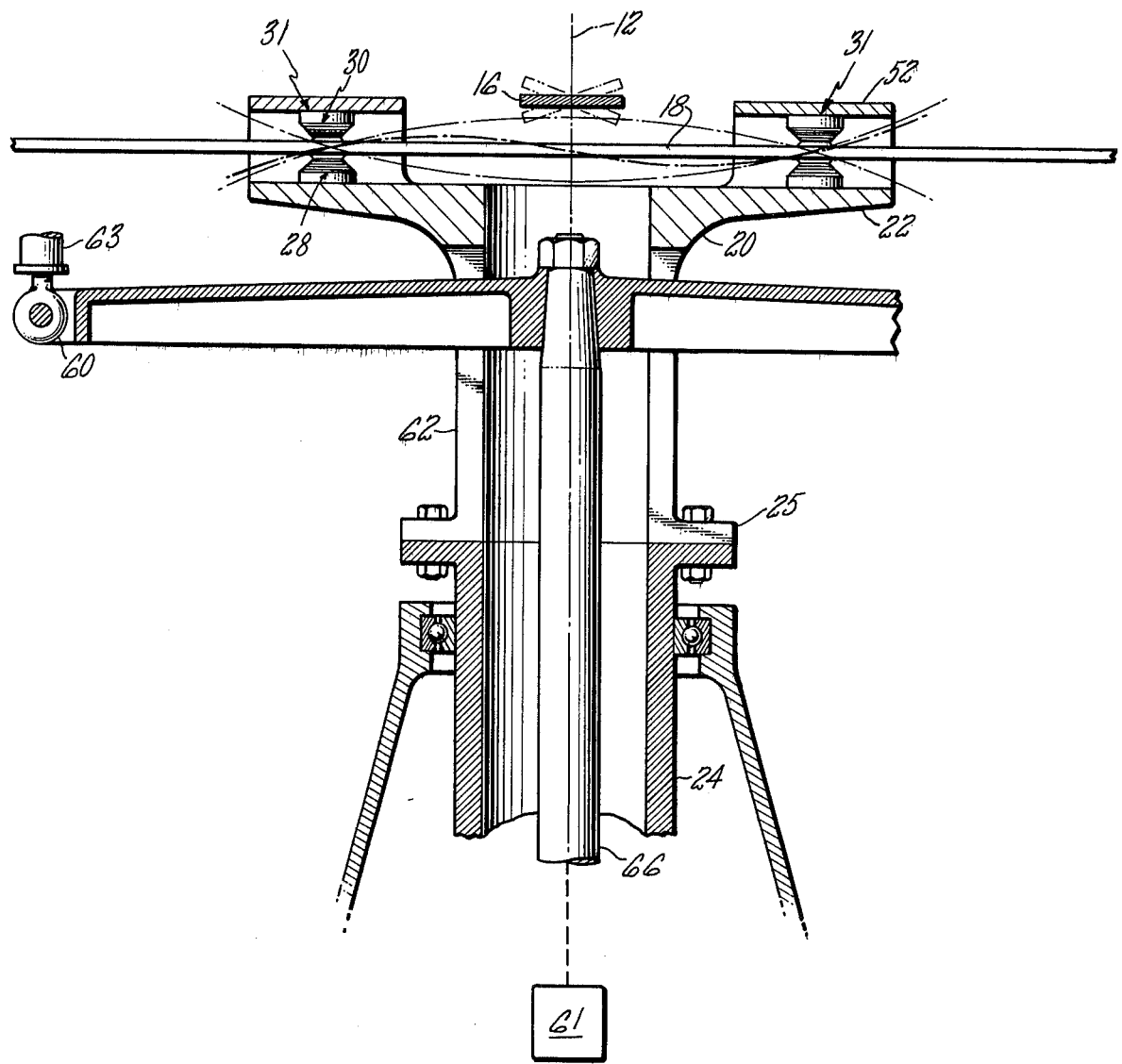
FIG. 2 is a cross-sectional view taken along the lines 2—2 of FIG. 1 to further illustrate the spar/hub support. A portion of the control linkage is depicted.

The environment of the invention is generally illustrated by FIG. 1 wherein helicopter rotor head 10 is depicted having axis 12 for rotation in a clockwise direction. An even number of rotor blades 14 (one shown only) extend in opposite directions in paired relationships. The spar members 16 and 18, for respective blade pairs, pass across each other at the rotor axis 12. Each pair of blades lies in a separate plane due to this stacking. Spacing is provided between crossing spars to provide clearance for all spar bending and twisting which will result from blade flapping and pitch changing, as best shown in FIG. 2. The rotor hub includes a central portion 20 and equally spaced hub arms 22 adapted to support and drive their respective blades 14. Hub portion 20 is joined to the helicopter drive shaft 24 by conventional means such as the bolted flange assembly 25 depicted in FIG. 2. At its outboard extremity, each hub arm 22 is formed with upturned flange 23, and is adapted to seat bearing support assembly 26, which consists of back-to-back bearing members 28 and 30 which cooperate to form spherical bearing 31. The flange 23 of arm 22 encompasses and is separated from its respective blade spar member, lower spar 18 being shown in FIG. 3. Lower bearing portion 28 comprises outer race 32, inner race 34, and elastomeric pack 36. The elastomeric pack 36 comprises spherical shaped discs 38, laminated with rubber or equivalent shear material 40, which is joined to the spherical mating faces of races 32 and 34. Race 34 is attached to the underside of spar member 18, and race 32 is attached to the upper face of hub arm 22 such that the center of spherical bearing 28 is coincident with and establishes blade feathering axis 50. Likewise, upper spherical bearing portion 30 is identical to bearing 28, and its race 34 is attached to the upperside of spar member 18, its outer race 32 is attached to the inner surface of clamp member 52, which is shaped to contain but not contact spar member 18. Similar to bearing portion 28, the pivot point of bearing portion 30 is coincident with feathering axis 50, so that bearing 31 supports spar 18 for universal motion about point 51 on feathering axis 50. Races 32 and 34 and laminates 38 and 40 are preferably concentric about axis 35 and spherical in shape about point 51. Depending flange 54 engages the upward facing flange 23 of hub arm 22, and a rigid connection is formed by bolts 56. While an elastomeric spherical bearing is shown in our preferred embodiment, any spherical bearing will suffice.

Figure 10:
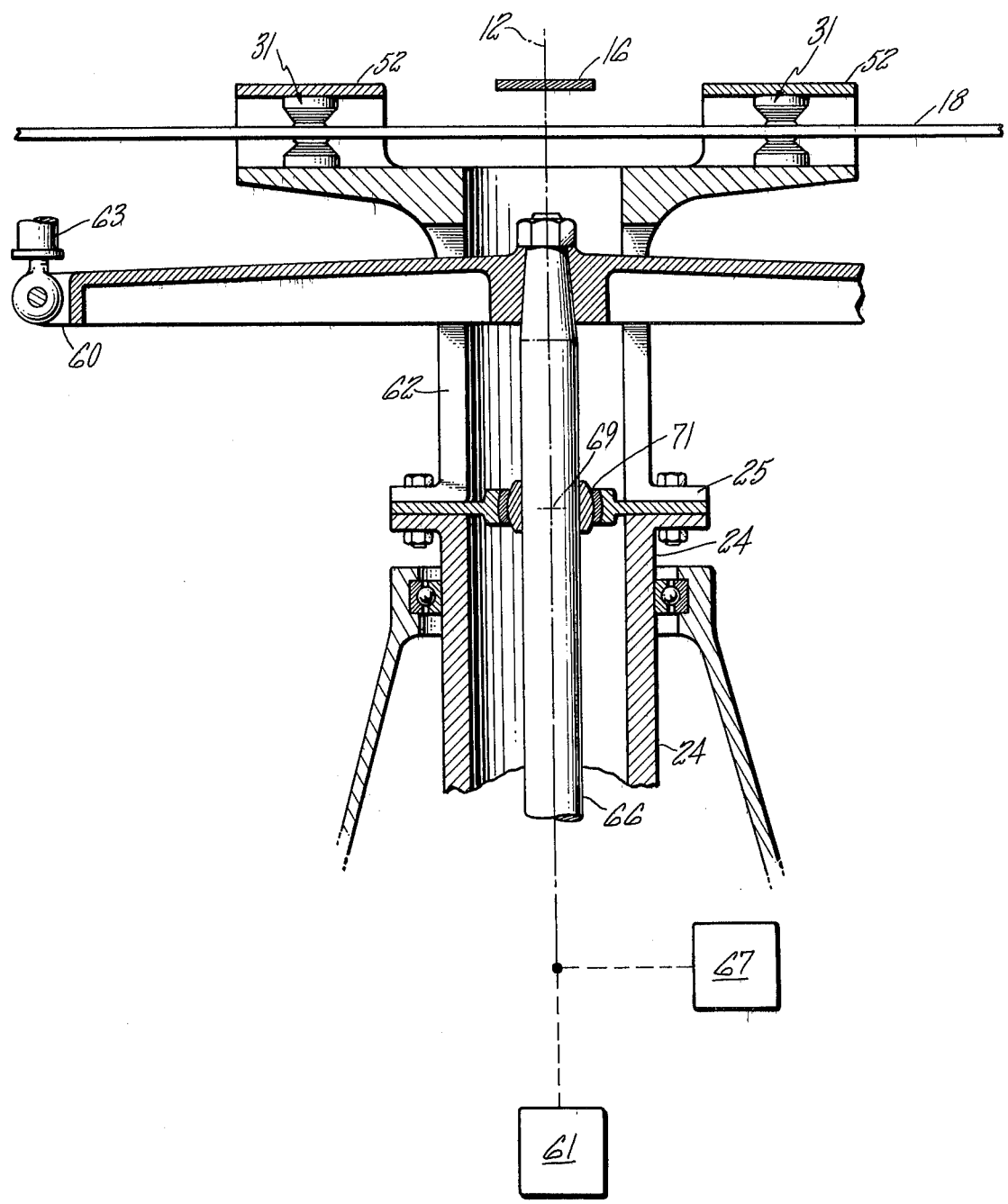
FIG. 10 is a showing of an alternative construction, corresponding to FIG. 2, but including means for cyclic pitch input.

FIG. 2 depicts a control embodiment preferred for use when the rotor depicted is utilized as a tail rotor, and it is desired to minimize drag by enclosing control linkage within the drive shaft. Pitch beam arms 60 protrude through selected openings 62 in drive shaft 24 and translate along axis 12 for collective control inputs in response to conventional control 61. Each pitch beam arm 60 connects to a blade mounted pitch horn 64 (FIG. 1), by vertical push rod 63. In a main rotor environment where cyclic pitch control is required, the construction shown in FIG. 10 could be utilized. In the FIG. 10 construction, which utilizes the same reference numerals for corresponding parts shown in FIG. 2, control shaft 66 is mounted to be tiltable about pivot point 69 as defined by bearing 71, which is supported from drive shaft 24 so that conventional control 67 may be utilized to tilt shaft 66 and pitch beam arms 60 and thence introduce cyclic pitch input to the blades through push rods 63 which connect at their other ends to pitch horns 64. In the main rotor environment, it may be preferred to position a swashplate assembly outside of the drive shaft and gearbox to provide cyclic pitch control, as an alternative to the construction shown in FIG. 10. Such swashplate assembly mechanism and its operation is well known in the art. In the tail rotor environment as shown in FIG. 2, cyclic pitch change requirements are imposed as a result of blade flapping motions. This cyclic pitch change occurs as the blade flaps because the pitch horn 64 is located at a distance away from the flapping axis which passes through pivot point 51. This effect is called Delta 3 coupling and typically one degree of flapping will produce one degree of cyclic pitch change.

The referenced prior art, Baskin U.S. Pat. No. 3,874,815, utilizes transverse straps or flexure members to provide hub/spar support. Such member shown schematically as bearing 70 in FIGS. 4a and 6a, is a flexible member clamped across the spar width. Blade flapwise bending or droop tends to twist the strap and allows flatwise bending of the spar to take place between opposed flexure members and across the rotor axis. This accommodation tailors the flap bending moment in the critical hub region to allow optimization of spar material and cross section, without exceeding safe stress limits. A similar capability is present in the structure of this invention, since one of the freedoms inherent in the bearing support assembly 26 is in flap bending. The phantom line showings of FIG. 2 depict the symmetrical and asymmetrical mode shape of the spar 18 when subjected to vertical blade loading in the same or opposite direction.

An objective of this invention is to improve over the prior art structure by addressing an additional blade freedom without a compromise to the flapwise or lead-lag bending capabiltiy. This is accomplished by utilizing a three degree of freedom spar/hub mount which has sufficient stiffness in one direction to serve as a rotor drive member.

FIGS. 4a, 5a, 6a, and 7a are isometric showings of both this invention and the prior art in operational mode when under the same pitch control inputs to emphasize the advantage of Applicant's invention over the prior art. FIGS. 4a and 6a are illustrative of prior art rotor heads, while FIGS. 5a and 7a depict the improvement taught herein.

It will be observed by reference to FIG. 4a that a cyclic pitch input to each opposed blade will tend to twist the flexible spar of the prior art over length "l" between the point of input (the pitch horn 64) and the radial location 70a or 70b where the spar is clamped by the retention member 70. The twist imparted to the advancing blade increases its angle of attack, while the twist simultaneously imparted to the retreating blade will conversely decrease its angle of attack. Twist will thus be imparted first in one direction and then in the other on each blade at a frequency on the average of 900 cycles per minute for the tail rotor environment as the blade rotates around the rotor axis. Between opposed retention members 70 or under the hub region of the rotor head between stations 70a and 70b the spar will remain flat and untwisted. The result of this restrained periodic spar twisting is the creation of high, oscillatory, torsional stresses in the spar. FIG. 4b graphically illustrates the changes in angle of twist depicted in the FIG. 4a prior art construction by plotting such angle of twist ($\theta$) against spar length (L). The dotted line graph illustrates that no angle change (twist) takes place across the rotor axis between the spar/hub supports between stations 70a and 70b, but the twist is confined to the length "l" of each spar between its support station 70a or 70b and its pitch horn. The torsional stress produced in the spar by this twist is proportional to the slope of the curve depicted in FIG. 4b.

FIG. 5a illustrates that a cyclic pitch input to the rotor head structure of this invention will merely tilt the common spar at each revolution and will not cause any spar twisting. Since the spherical bearings 31 accommodate this tilting, there are no torsional stresses produced. FIG. 5b graphically illustrates that cyclic pitch produces an angle of twist for the spar on opposite sides of the rotor axis that is a constant across the rotor hub from the pitch input on one side to that on the other side of rotor. The zero slope of the curve indicates that no stress is produced.

FIG. 6a illustrates the effects of a collective pitch input at opposed pitch horns of the prior art rotor, wherein the angle of twist is increased on opposite blade spar pairs simultaneously. Since the blade spar support members 70 are rigid to twisting, the same effect is produced as with the cyclic pitch input; namely, that simultaneous twist is imparted to each blade spar between its support member 70 and its pitch horn. No twist takes place between the support members 70. This produces a steady torsional stress in the spar which is a function of the angle of twist, spar cross-section, and length "l" between the pitch horn 64 and spar support station 70a or 70b. FIG. 6b is similar to FIG. 4b in that twisting is imposed separately on each opposed spar and does not take place or produce an angle of twist change between support stations 70a and 70b.

FIG. 7a illustrates the blade spar 16 supported by the bearing assemblies 31 of this invention, which allows spar twisting due to pitch inputs to take place over the full distance L between the pitch horns 64. As shown in the graph of FIG. 7b, the allowance of blade twist to take place over the full distance between the blade pitch horns 64 imparts less angular twist at the support stations and therefore does not produce as severe a steady state torsional stress in the spar for the same pitch input and blade spar cross-section. It is noted that the slope of the curve of FIG. 7b is less than the slope of FIG. 6a, indicative of a lower stress.

While the complete elimination of cyclic torsional stresses due to cyclic pitch changes is the principal benefit and feature of this invention, the secondary benefit of a reduction of these steady state stresses due to collective pitch is also a desirable goal and an aid to the rotor head designer. The advantage of Applicant's construction over the prior art in collective pitch mode is illustrated in FIGS. 6b and 7b which show that in the prior art construction, the twist imparted to each blade by a cyclic pitch input must be accommodated in small distance l, whereas, in Applicant's construction this twist can be accommodated in the much larger distance L, to effect reduced spar stresses. If desired, Applicant can design the structure to work the spar at a high but tolerable torsional stress and shorten the working length of the spar, thus lightening the structure and providing for an improved blade airfoil contour, by increasing the effective thrust producing area and reducing drag.

Figure 9:
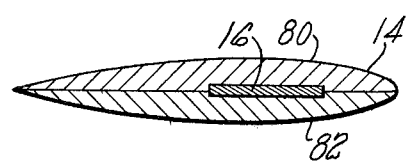
FIG. 9 is a showing of the support connection between the blade and spar.

In view of the fact that in this construction, the blade may move in pitch directly with the spar and no provision need be made for relative pitch change motion therebetween, blade 14 may be directly connected to spar 16 by any convenient means at one or more stations along the span of spar 16, for example, blade 14 may be split in two halves 80 and 82 as shown in FIG. 9 which may be bonded or otherwise connected to spar 16.

Figure 8:
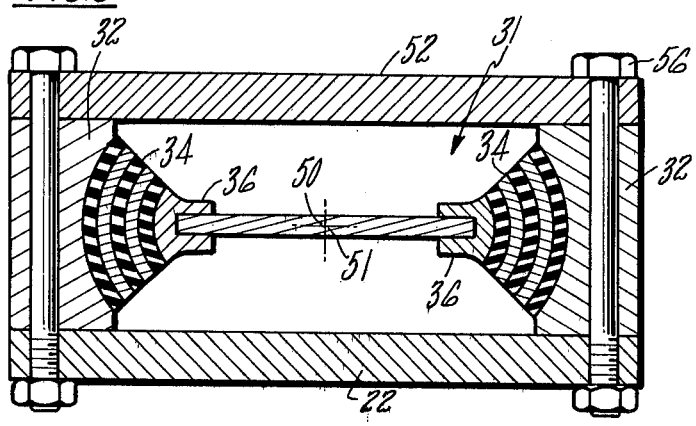
FIG. 8 is a cross-sectional showing, corresponding to FIG. 3, of an alternative spar support embodiment.

While the embodiments presented herein depict and describe the mounting of elastomeric bearing 28 and 30 portions on the upper and lower surfaces of the spar member, with their pivot points 51 coincident with the blade pitch change axis 50, the designer may choose to orient these bearings 90° such that the pivot point 51 remains coincident, but the bearings are mounted to the spar edges to provide greater bearing in-plane stiffness, as shown in FIG. 8. The same reference numerals are used in FIG. 8 as in FIGS. 1-3 to identify corresponding parts.

It should be understood that while cyclic and collective angles imposed on the rotor blades are discussed independently as if by separate actions, in the operation of Applicant's rotor, these angles will be imposed in a combined manner as a result of the pilot's control inputs via conventional mixing units as well as a result of typical rotor pitch/flap and pitch/lag coupling characteristics. The superimposing of cyclic and collective pitch changes in the same angular direction create an additive torsional stress condition that is a serious concern and may be relieved by use of this invention.

I wish it to be understood that I do not desire to be limited to the exact details of construction shown and described, for obvious modifications will occur to a person skilled in the art.

I claim:

1. A helicopter rotor adapted to be mounted for rotation about an axis of rotation and comprising:
   a spar member flexible in flapping, in-plane bending, and in twisting and extending through and on opposite sides of said axis or rotation and having a feathering axis about which said twisting occurs,
   a blade positioned at opposite ends of said spar and supported therefrom for rotation therewith,
   a hub member supporting said spar for rotation about said axis of rotation and connected thereto, and
   means connecting said spar to said hub comprising two spherical bearings supported from said hub at stations on opposite sides of said rotational axis and each supporting said spar therefrom for universal motion about a point on said feathering axis.

2. A rotor according to claim 1 wherein said spherical bearings are located equidistant from the axis of rotation.

3. A rotor according to claim 2 and including means to cause said spar to tilt about said feathering axis to accommodate cyclic pitch variations imposed on said blades.

4. A rotor according to claim 2 including pitch horns and means to cause said spar to twist uniformly between said pitch horns to accommodate collective pitch variations imposed on said blades.

5. A helicopter rotor according to claim 1 wherein said spherical bearings are elastomeric.

6. A rotor according to claim 5 wherein said elastomeric bearings comprise alternate elastomer and rigid spherical laminates stacked between spherical inner and outer races.

7. A rotor according to claim 1 wherein one half of each of said spherical bearings is positioned above and connected to said spar and the other half of each of said spherical bearings is positioned below and connected to said spar so that said spherical bearings halves cooperate to define a spherical bearing mounting the spar from the hub so as to permit spar universal motion with respect to the hub.

8. A rotor according to claim 1 wherein each of said spherical bearings includes one spherical bearing portion positioned between one lateral edge of the spar and the hub and a second spherical bearing portion positioned between the other lateral edge of the spar and the hub so that said spherical bearing portions cooperate to support said spar for universal motion with respect to said hub.

9. A rotor according to claim 1 and including means connecting said blade directly to said spar to provide a blade of minimal drag and maximum thrust and aerodynamic efficiency and to permit direct blade pitch change movement with the spar.

* * * * *